United States Patent
Zhao et al.

(10) Patent No.: US 11,872,595 B2
(45) Date of Patent: Jan. 16, 2024

(54) WET SORTING PROCESS FOR WASTE LITHIUM BATTERY AND APPLICATION THEREOF

(71) Applicants: HUNAN BRUNP RECYCLING TECHNOLOGY CO., LTD., Hunan (CN); GUANGDONG BRUNP RECYCLING TECHNOLOGY CO., LTD., Guangdong (CN); HUNAN BRUNP EV RECYCLING CO., LTD., Hunan (CN)

(72) Inventors: Jieming Zhao, Hunan (CN); Qinxue Gong, Hunan (CN); Ruokui Chen, Hunan (CN); Qiang Li, Hunan (CN); Changdong Li, Hunan (CN)

(73) Assignees: HUNAN BRUNP RECYCLING TECHNOLOGY CO., LTD., Hunan (CN); GUANGDONG BRUNP RECYCLING TECHNOLOGY CO., LTD., Guangdong (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/029,654

(22) PCT Filed: May 13, 2021

(86) PCT No.: PCT/CN2021/093664
§ 371 (c)(1),
(2) Date: Mar. 30, 2023

(87) PCT Pub. No.: WO2022/142067
PCT Pub. Date: Jul. 7, 2022

(65) Prior Publication Data
US 2023/0302498 A1    Sep. 28, 2023

(30) Foreign Application Priority Data

Dec. 28, 2020 (CN) .......................... 202011584671.9

(51) Int. Cl.
*B07B 15/00* (2006.01)
*B09B 3/35* (2022.01)
(Continued)

(52) U.S. Cl.
CPC .............. *B07B 15/00* (2013.01); *B03C 1/005* (2013.01); *B09B 3/35* (2022.01); *B07B 2220/04* (2013.01);
(Continued)

(58) Field of Classification Search
CPC . B07B 15/00; B07B 2230/01; B07B 2220/04; B03C 1/005; B09B 3/35; B09B 2101/16
See application file for complete search history.

(56) References Cited

U.S. PATENT DOCUMENTS 11,135,595 B2 * 10/2021 Kochhar ................... B03C 1/23
2021/0376399 A1 * 12/2021 Morin ....................... C25B 1/22

FOREIGN PATENT DOCUMENTS

| CN | 107262263 A | 10/2017 |
| CN | 108400400 A | 8/2018 |

(Continued)

OTHER PUBLICATIONS

First Office Action issued by the State Intellectual Property Office of People's Republic of China for Chinese Patent Application No. 202011584671.9, dated Apr. 26, 2022, with an English translation.
(Continued)

*Primary Examiner* — Michael McCullough
*Assistant Examiner* — Kalyanavenkateshware Kumar
(74) *Attorney, Agent, or Firm* — MYERS WOLIN, LLC (57) ABSTRACT

Disclosed are a wet sorting process for a waste lithium battery and application thereof, which belong to the field of
(Continued)

battery material recycling. The wet sorting process includes the following steps of carrying out wet ball milling on a sorting material of a waste lithium battery to obtain a ball-milled product, screening the ball-milled product to obtain a coarse-grained screened material, a medium-grained screened material and a fine-grained screened material, carrying out wet ball milling, screening, magnetic separation and table concentration on the medium-grained screened material to obtain copper, aluminum and a steel shell, and carrying out flotation, magnetic separation and table concentration on the fine-grained screened material to obtain cathode material powder, graphite, copper and aluminum.

10 Claims, 4 Drawing Sheets

(51) Int. Cl.
*B03C 1/005* (2006.01)
*B09B 101/16* (2022.01)

(52) U.S. Cl.
CPC ....... *B07B 2230/01* (2013.01); *B09B 2101/16* (2022.01)

(56) References Cited

FOREIGN PATENT DOCUMENTS

| | | |
|---|---|---|
| CN | 108736087 A | 11/2018 |
| CN | 110479478 A | 11/2019 |
| CN | 111468284 A | 7/2020 |
| CN | 112756104 B | 1/2023 |

OTHER PUBLICATIONS

Notification to Grant Patent Right for Invention issued by The State Intellectual Property Office of People's Republic of China for Chinese Patent Application No. 202011584671.9, dated Oct. 28, 2022, with an English translation.

* cited by examiner

WET SORTING PROCESS FOR WASTE LITHIUM BATTERY AND APPLICATION THEREOF

CROSS-REFERENCE TO RELATED APPLICATIONS

This application is a National Stage under 35 U.S.C. § 371 of International Application Number PCT/CN2021/093664, filed on May 13, 2021, and which designated the U.S., which claims priority to Chinese Patent Application No. 202011584671.9, filed on Dec. 28, 2020. The contents of each are incorporated herein by reference in their entirety.

TECHNICAL FIELD

The present disclosure belongs to the field of recycling battery materials, and particularly relates to a wet sorting process for a waste lithium battery and an application thereof.

BACKGROUND

Lithium ion batteries are widely used in military, aviation, mobile electronic terminal, electronic appliance, medical treatment, industry and other fields due to the advantages of large energy storage capacity, long service life, recyclability, good safety performance and high working pressure thereof. In recent years, with the continuous development of new energy vehicles, the annual demand and usage of lithium batteries have increased steeply year by year. However, the batteries deteriorate after being circulated for a period of time, which leads to the failure of the batteries, and the discharge of chemical reagents therein into the environment will bring great harm to the environment and waste resources at the same time. Therefore, recycling the lithium batteries can not only effectively utilize resources, but also effectively reduce the environmental pollution caused by waste batteries.

A structure of a waste lithium battery mainly consists of a cathode, an anode, electrolyte, shell, diaphragm, or the like. A main part to be recycled is the cathode material, the main substances of which include lithium cobaltate and other ternary lithium compounds. The main processes of recycling waste batteries include pretreatment, treatment of cathode material, leaching and other procedures. The present disclosure provides a wet sorting process, which aims to effectively separate graphite, cathode material powder, copper, aluminum and steel shell from a calcined and crushed waste lithium battery, thereby effectively recycling resources.

SUMMARY

An object of the present disclosure is to provide a wet sorting process for a waste lithium battery and an application thereof. A combined treatment of "reselection, magnetic separation and flotation" is adopted in the process, which can recycle graphite, copper, aluminum and cathode material powder in battery materials with low cost and high safety, and can reuse circulating water.

In order to achieve the above object, the present disclosure adopts the following technical solutions.

A wet sorting process for a waste lithium battery includes the following steps of:

(1) carrying out wet ball milling on a sorting material of the waste lithium battery to obtain a ball-milled product;
(2) screening the ball-milled product to obtain a coarse-grained screened material, a medium-grained screened material and a fine-grained screened material;
(3) carrying out wet ball milling, screening, magnetic separation and table concentration on the medium-grained screened material to obtain copper, aluminum and a steel shell; and
(4) carrying out flotation, magnetic separation and table concentration on the fine-grained screened material to obtain cathode material powder, graphite, copper and aluminum.

Preferably, in step (1), the waste lithium battery is one of a waste ternary square-shell lithium battery and a waste lithium cobaltate pouch battery.

Preferably, in step (1), the sorting material of the waste lithium battery is obtained by the following method: soaking the waste lithium battery in saturated brine for electro discharge treatment; washing and drying the discharged waste lithium battery; and calcining and crushing the dried battery to obtain a battery slice (the sorting material of the waste lithium battery).

More preferably, the battery slice has a size of 0.2 mm to 0.4 mm.

Preferably, in step (1), a mass concentration of the sorting material of the waste battery in the wet ball milling ranges from 50% to 60%, and a filling rate of a steel ball ranges from 35% to 40% (a ratio of a bulk volume of the steel ball to an effective volume of a ball mill).

Preferably, the process of the wet ball milling in step (1) is: adding the steel ball with the filling rate of 35% to 40% into the ball mill, adding water to adjust a concentration of the sorting material of the waste lithium battery to be in a range of 50% to 60%, and feeding the separation material of the waste lithium battery into a feeding port of the ball mill, starting the ball mill to carry out ball milling to obtain the ball-milled product. Under the continuous grinding action between the steel balls, cathode and anode material powders covered on a surface of a current collecting plate in the sorting material of the waste lithium battery drop, and most of the dropped cathode and anode material powders will be ground into small particles, and the cathode and anode material powders are separated by screening.

Preferably, in step (2), a size of a sieve hole of the screening ranges from 0.15 mm to 2 mm.

Preferably, in step (2), the coarse-grained screened material has a particle size of 2 mm to 4 mm, the medium-grained screened material has a particle size of 0.15 mm to 2 mm, and the fine-grained screened material has a particle size of 0 mm to 0.15 mm.

Preferably, in step (2), the coarse-grained screened material is returned to step (1) for ball milling.

Preferably, in step (3), a mass concentration of the medium-grained screened material in the wet ball milling ranges from 45% to 55%, and a filling rate of the steel ball ranges from 40% to 45%.

Preferably, in step (3), a size of a sieve hole of the screening is 0.15 mm, and a screened product with a size smaller than 0.15 mm is fed into step (4) for flotation.

Preferably, in step (3), the specific process of the magnetic separation is: adding the medium-grained screened material to a feeding trough of a magnetic separator, adding water to adjust a concentration of the medium-grained screened material, and feeding the medium-grained screened material into the magnetic separator for magnetic separation to obtain the steel shell, the copper and the aluminum. Under the action of a magnetic system of the magnetic separator, the magnetic steel shell will change an original motion track due to the action of a magnetic force, thus separating from a nonmagnetic material and achieving a separation effect.

Preferably, in step (3), a magnetic field intensity of the magnetic separation ranges from 5,000 Gs to 6,000 Gs, and a mass concentration of the fed material of the magnetic separation ranges from 20% to 30%.

Preferably, in step (3), a mass concentration of the fed material of the table concentrator ranges from 15% to 25%.

Preferably, in step (4), the specific process of the flotation is: roughing the fine-sized screened material to obtain a roughed concentrate and a roughed tailing, and carrying out primary cleaning and secondary cleaning on the roughed concentrate to obtain a graphite concentrate; and carrying out primary scavenging and secondary scavenging on the roughed tailing to obtain a graphite-removed product.

More preferably in step (4), the specific process of the flotation is: roughing the fine-grained screened material to obtain the roughed concentrate and the roughed tailing first, then carrying out primary cleaning on the roughed concentrate to obtain a concentrate 1 and a middling 1; carrying out secondary cleaning on the concentrate 1 to obtain graphite and a middling 2, and carrying out next round of primary cleaning on the middling 2 and a roughed concentrate produced in next round; carrying out primary scavenging on the roughed tailing to obtain a scavenged concentrate 1 and a scavenged tailing 1, then carrying out secondary scavenging on the scavenged tailing 1 to obtain a final tailing and a scavenged concentrate 2, the final tailing being the graphite-removed product, and carrying out next round of primary scavenging on the scavenged concentrate 2 and a roughed tailing produced in next round; and carrying out next round of roughing on the middling 1, the scavenged concentrate 1 and the materials of next round.

Preferably, in step (4), a preparation used in the flotation includes a collecting agent, a foaming agent and a dispersing agent; the collecting agent is diesel oil; the foaming agent is No. 2 oil; and the dispersing agent is sodium hexametaphosphate. A molecular formula of No. 2 oil is ROH(R-alkyl)

More preferably, an addition amount of the collecting agent ranges from 200 g/t to 300 g/t; an addition amount of the foaming agent ranges from 150 g/t 200 g/t; and an addition amount of the dispersing agent ranges from 1,200 g/t to 1,500 g/t.

Preferably, in step (4), a magnetic field intensity of the magnetic separation ranges from 3,000 Gs to 4,000 Gs, and a concentration of the fed material of the magnetic separation ranges from 30% to 40%.

Preferably, in step (3), the specific process of the table concentration is: adding a nonmagnetic material after the magnetic separation to a feeding port of a table concentrator, adding water to adjust a concentration of the nonmagnetic material after the magnetic separation, and vibrating based on a difference in specific gravities between the copper and the aluminum to separate the copper and the aluminum.

According to a difference in specific gravities between the copper and the aluminum, under the vibrating of a certain frequency, the copper and the aluminum show different motion trajectories on a surface of the table concentrator. Taking junctions of the motion trajectories of the copper and the aluminum as boundaries, a plurality of receiving troughs are arranged to separate the copper and the aluminum.

Preferably, in step (4), a mass concentration of the fed material of the table concentrator ranges from 25% to 30%.

The present disclosure further provides an application of the above-mentioned wet sorting process in recycling a battery.

The present disclosure has the advantages as follows:

According to the wet sorting process for the waste lithium battery of the present disclosure, a combined treatment of "reselection (i.e., a hydraulic separation method, which corresponds to the table concentration in the process), magnetic separation and flotation" is adopted. A recycling rate of the steel shell is 99%, a recycling rate of the graphite ranges from 90% to 92%, a recycling rate of the cobalt in the cathode material powder is 99% or above, a recycling rate of the nickel is 99% or above, a recycling rate of the manganese is 99% or above, a recycling rate of the copper ranges 93% to 95%, and a recycling rate of the aluminum ranges 93% to 95%. This process is mainly based on a physical recycling method, which can recycle the graphite, the copper, the aluminum and the cathode material powder in the battery material with low cost and high safety, and the circulating water (backwater in ball milling, screening, reselection and magnetic separation) can be reused.

DETAILED DESCRIPTION

In order to deeply understand the present disclosure, the preferred experimental solutions of the present disclosure will be described below with reference to the embodiments to further illustrate the characteristics and advantages of the present disclosure. Any change or change that does not deviate from the main idea of the present disclosure can be understood by those skilled in the art, and the protection scope of the present disclosure is determined by the scope of the claims.

If the specific conditions are not indicated in the embodiments of the present disclosure, the conventional conditions or the conditions suggested by the manufacturers shall be followed. The materials, reagents, and the like, which are not indicated by the manufacturers, are all conventional products that can be obtained through commercial purchase.

Embodiment 1

Figure 3:
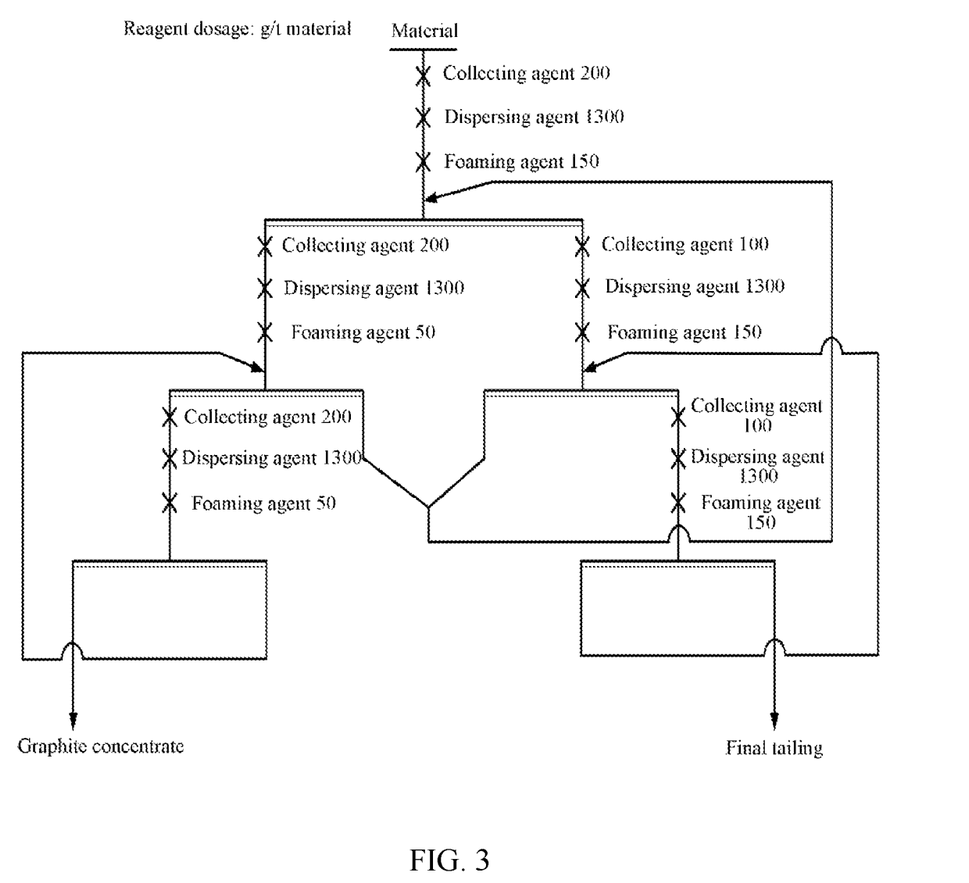
FIG. 3 is a process flowchart of flotation in Embodiment 1 of the present disclosure.

A wet sorting process for a waste lithium battery included the following steps of:
(1) carrying out first-stage wet ball milling on 1 ton of sorting materials of waste ternary square-shell lithium batteries under the conditions of a ball milling concentration of 60% and a filling rate of a steel ball of 40% to obtain a ball-milled product;
(2) adding the ball-milled product into vibrating screens with mesh sizes of 2 mm and mm respectively for screening to obtain three screened materials, namely a coarse-grained screened material (the coarse-grained product was returned to a first-stage ball-milling feeding place), a medium-grained screened material and a fine-grained screened material;

(3) adding water into the medium-grained screened material to adjust a concentration to 50%, performing second-stage wet ball milling-screening under the conditions of a filling rate of the steel ball of 45% and a mesh size of 0.15 mm, adding an appropriate amount of water into the obtained material of 0.15 mm to 0.2 mm to adjust the concentration to 25%, separating a steel shell in the material through a magnetic separator with a magnetic field intensity of 5,000 Gs, and adding an appropriate amount of water into the separated material, subjecting the separated material to a table concentration to obtain coarse-grained copper product and aluminum product, and feeding the material of 0 mm to 0.15 mm after the second-stage screening to the procedure of flotation to separate graphite; and (4) adding water into the fine-grained product to adjust the concentration to 50%, and obtaining a graphite concentrate through a closed-circuit flotation flow of "one roughing, two cleanings and two scavengings" (i.e., roughing the material to obtain a roughed concentrate and a roughed tailing first, then carrying out primary cleaning on the roughed concentrate to obtain a concentrate 1 and a middling 1, carrying out secondary cleaning on the concentrate 1 to obtain a graphite concentrate and a middling 2, and carrying out next round of primary cleaning on the middling 2 and a roughed concentrate produced in next round; carrying out primary scavenging on the roughed tailing to obtain a scavenged concentrate 1 and a scavenged tailing 1, carrying out secondary scavenging on the scavenged tailing 1 to obtain a final tailing and a scavenged concentrate 2, the final tailing being a graphite-removed product, and carrying out next round of primary scavenging on the scavenged concentrate 2 and a rough tailing produced in next round together; and carrying out next round of roughing on the middling 1, the scavenged concentrate 1 and a material of next round together, referring to FIG. 3 for the specific flow and reagent dosages), adding an appropriate amount of water into the material after flotation to adjust the concentration to 35%, separating a cathode material powder (black powder) in the material after flotation through a magnetic separator with a magnetic field intensity of 4,000 Gs, adding an appropriate amount of water into the material after magnetic separation to adjust the concentration to 25%, and subjecting the material after magnetic separation to table concentration to obtain fine-grained copper product and aluminum product.

In the final product obtained in this embodiment, a recycling rate of the steel shell is 99%, a recycling rate of the graphite is 91.28%, a recycling rate of cobalt in the cathode material powder is 99.4%, a recycling rate of nickel is 99.5%, a recycling rate of manganese is 99.2%, a recycling rate of the copper is 94.43%, and a recycling rate of the aluminum is 93.67%.

Figure 1:
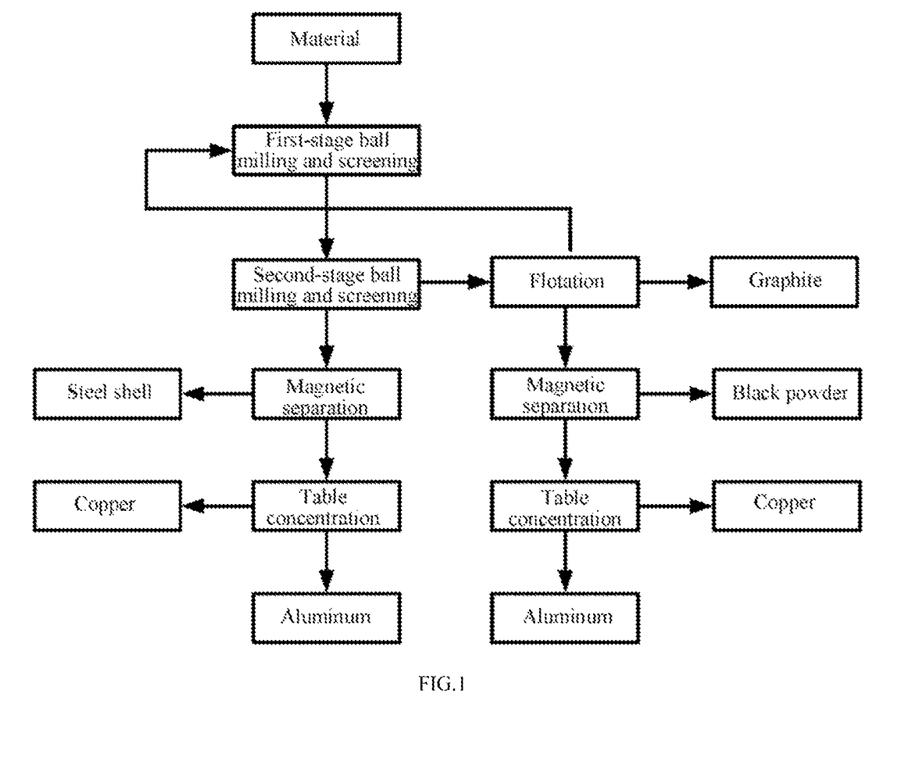
FIG. 1 is a process flowchart of Embodiment 1 of the present disclosure.

FIG. 1 is a process flowchart of Embodiment 1 of the present disclosure. It can be seen from FIG. 1 that the hard steel shell is used outside the waste ternary square-shell lithium battery, so the flowchart in Embodiment 1 needs the process of magnetic separation and deferrization, and entirely adopts "two-stage ball milling and screening, coarse-grained material returning, medium-grained material reselection, and joint sorting of flotation, magnetic separation and reselection on the fine-grained material".

FIG. 3 is a process flowchart of flotation in Embodiment 1 of the present disclosure. It can be seen from in FIG. 3 that the graphite and a flotation tailing (i.e., a mixture of the cathode material powder, copper and aluminum) can be obtained by flotation.

Embodiment 2

A wet sorting process of a waste lithium battery included the following steps of:
(1) carrying out first-stage wet ball milling on 1 ton of sorting materials of waste lithium cobaltate pouch batteries under the conditions of a ball milling concentration of 55% and a filling rate of a steel ball of 35% to obtain a ball-milled product;
(2) adding the ball-milled product into vibrating screens with mesh sizes of 2 mm and mm respectively for screening to obtain three screened materials, namely a coarse-grained screened material (the coarse-grained product was returned to a first-stage ball-milling feeding place), a medium-grained screened material and a fine-grained screened material;
(3) adding water into the medium-grained product to adjust a concentration to 52%, performing second-stage wet ball milling-screening under the conditions of a filling rate of the steel ball of 40% and a mesh size of 0.15 mm to obtain a material of 0.15 mm to 2 mm, adding an appropriate amount of water into the obtained material of 0.15 mm to 0.2 mm to adjust the concentration to 20%, and subjecting the separated material to a table concentration to obtain coarse-grained copper product and aluminum product; and feeding the material of 0 mm to mm after the second-stage screening to the procedure of flotation to separate graphite; and
(4) adding an appropriate amount of water into the fine-grained product to adjust the concentration to 45%, and obtaining a graphite concentrate through a closed-circuit flotation flow of "one roughing, two cleanings and two scavengings" (i.e., roughing the material to obtain a roughed concentrate and a roughed tailing first, then carrying out primary cleaning on the roughed concentrate to obtain a concentrate 1 and a middling 1, carrying out secondary cleaning on the concentrate 1 to obtain a graphite concentrate and a middling 2, and carrying out next round of primary cleaning on the middling 2 and a roughed concentrate produced in next round; carrying out primary scavenging on the roughed tailing to obtain a scavenged concentrate 1 and a scavenged tailing 1, carrying out secondary scavenging on the scavenged tailing 1 to obtain a final tailing and a scavenged concentrate 2, the final tailing being a graphite-removed product, and carrying out next round of primary scavenging on the scavenged concentrate 2 and a rough tailing produced in next round together; and carrying out next round of roughing on the middling 1, the scavenged concentrate 1 and a material of next round together, referring to FIG. 4 for the specific flow and reagent dosages), adding an appropriate amount of water into the material after flotation to adjust the concentration to 30%, separating a cathode material powder (black powder) in the material after flotation through a magnetic separator with a magnetic field intensity of 4,500 Gs, adding an appropriate amount of water into the material after magnetic separation to adjust the concentration to 24%, and subjecting the material after magnetic separation to table concentration to obtain fine-grained copper product and aluminum product. In the final product obtained in this embodiment, a recycling rate of the graphite is 90.57%, a recycling rate of cobalt in the cathode material powder is 99.5%, a recycling rate of copper is 93.81%, and a recycling rate of the aluminum is 94.95%.

Figure 2:
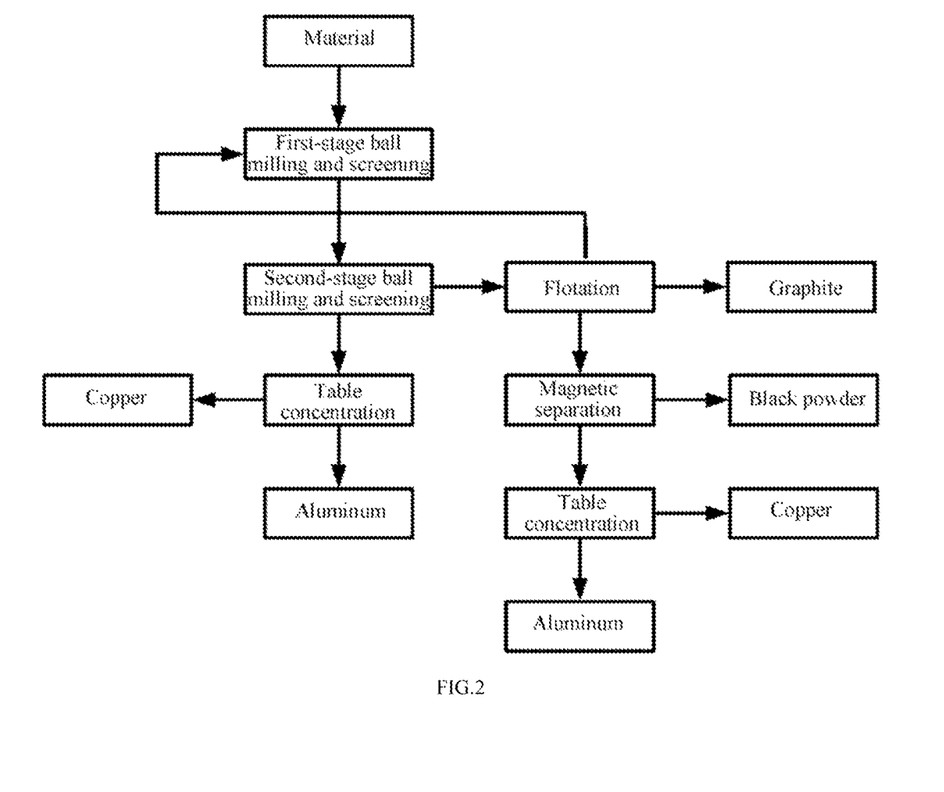
FIG. 2 is a process flowchart of Embodiment 2 of the present disclosure.

FIG. 2 is a process flowchart of Embodiment 2 of the present disclosure. It can be seen from FIG. 2 that most of the pouch lithium batteries are polymer lithium batteries, the outsides of which are not provided with the hard steel shells, so the flowchart in Embodiment 2 omits the process of magnetic separation and deferrization, and entirely adopts "two-stage ball milling and screening, coarse-grained material returning, medium-grained material reselection, and joint sorting of flotation, magnetic separation and reselection on the fine-grained material".

Figure 4:
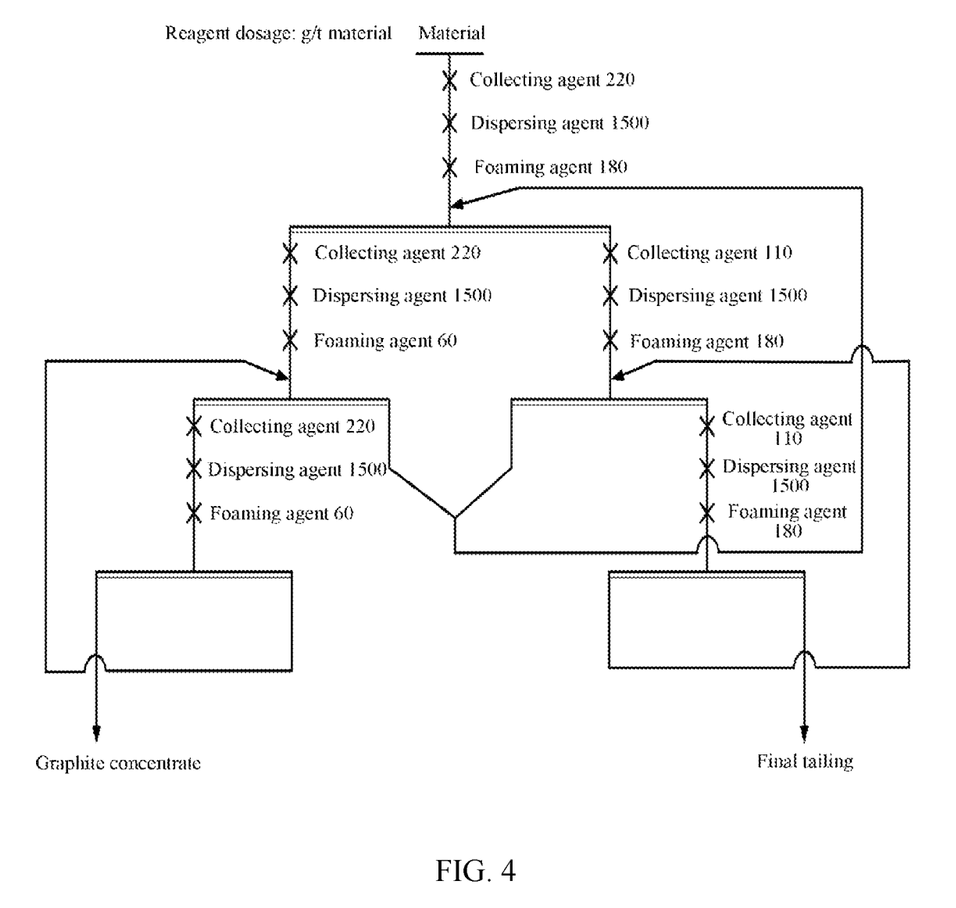
FIG. 4 is a process flowchart of flotation in Embodiment 2 of the present disclosure.

FIG. 4 is a process flowchart of flotation in Embodiment 2 of the present disclosure. It can be seen from in FIG. 4 that the graphite and a flotation tailing (i.e., a mixture of the cathode material powder, copper and aluminum) can be obtained by flotation.

Comparative Example 1 (CN111534697A)

Batteries used in the comparative example were square ternary lithium ion batteries from a factory in Hunan Province, China.

(1) A waste ternary lithium ion battery was treated by chemical discharge, and the discharged battery was subjected to multiple-stage crushing to be less than 50 mm in a nitrogen atmosphere. The crushed battery was pyrolyzed and pretreated at 500° C. in a nitrogen atmosphere for 2 hours to obtain a pyrolysis product, and the generated pyrolysis flue gas was discharged after secondary combustion, surface cooling, high-temperature bag dust collection and tail gas purification.

(2) The pyrolysis product are washed and classified into particle sizes which were greater than 2 mm, ranged from 0.15 mm to 2 mm and less than 0.15 mm, and a lithium-rich solution. The three particle sizes were subjected to magnetic separation at a magnetic field intensity of 240 kA/m respectively to obtain magnetic separation tailings with two particle sizes of nickel-cobalt-manganese intermediate product which were greater than 2 mm and ranged from 0.15 mm to 2 mm as copper and aluminum products the recycling rates of which were 90.41% and 89.51% respectively. Magnetic separation tailings with the particle sizes less than 0.15 mm were black powder and graphite product, which were mixed with water to form a flotation slurry with a concentration of 30 wt %. 500 g/t of sodium sulfide, 200 g/t of diesel oil and 40 g/t of terpineol oil were added into the flotation slurry for graphite flotation, and graphite with C grade of 91.36% and recycling rate of 88.59% was obtained by flotation, and the flotation tailings were black powder.

(3) The black powder and the nickel-cobalt-manganese intermediate product were reduced and roasted for 1 hour at 500° C. in a hydrogen reducing atmosphere to obtain reduced roasting slag. As a leaching agent, water was used to leach the roasting slag at 80° C. at a liquid-solid ratio of 3:1 and leaching for 1 hour. After solid-liquid separation, water leaching slag and lithium-containing leachate were obtained. The lithium-containing solution obtained from the beneficiation process and the lithium-containing leachate obtained from water leaching were combined, and $CO_2$ was introduced to evaporate and crystallize to obtain a lithium carbonate product. A comprehensive recycling rate of lithium was 98.6%.

(4) The water leaching slag, fusing agents quartz sand and limestone, and reducing agent coke were reduced and smelted at 1,600° C. for 2 hours, so that a nickel-cobalt-manganese alloy and smelting slag could be obtained. The smelting slag was harmless after being solidified at high temperature and could be directly landfilled. The flue gas produced by reduction smelting was discharged after secondary combustion, waste heat boiler, surface cooling, high temperature bag dust collection and tail gas purification and absorption.

(5) The nickel-cobalt-manganese alloy was leached with 5.5 mol/L sulfuric acid for 1 hour at a liquid-solid ratio of 5:1 and a temperature of 90° C., and impurities were removed from leached pickle liquor by P204 extraction. The purified nickel-cobalt-manganese solution obtained might be used as a material for a downstream lithium ion battery material manufacturing enterprise.

(6) A purity of the product obtained after comprehensive recycling treatment by the combination of beneficiation and metallurgy was as follows: Recycling rates of the copper and the aluminum in the copper and aluminum products might reach 90.41% and 89.51%, a recycling rate of graphite reached 88.59%, a purity of lithium carbonate obtained by wet lithium extraction was 99.7%, and recycling rates of lithium, nickel, cobalt and manganese were 98.6%, 99.1%, 99.3% and 98.7 respectively.

Result Comparison:

1. Recycling Rate

TABLE 1

Recycling rates of Embodiment 1 and Comparative Example 1

| Recycling object | | Recycling rate of Embodiment 1 (%) | Recycling rate of Embodiment 2 (%) | Recycling rate of Comparative Example 1 (%) |
|---|---|---|---|---|
| Cathode material powder | Nickel | 99.5 | — | 99.1 |
| | Cobalt | 99.4% | 99.5 | 99.3 |
| | Manganese | 99.2 | — | 98.7 |
| Steel shell | | 99% | — | — |
| Graphite | | 91.28% | 90.57% | 88.59 |
| Copper product | | 94.43% | 93.81% | 90.41 |
| Aluminum product | | 93.67% | 94.95% | 89.51 |

TABLE 2

Purity of cathode material powder obtained by recycling

| Element | Content in Embodiment 1/% | Content in Embodiment 2/% | Content in Comparative Example 1/% |
|---|---|---|---|
| Nickel | 40.53 | — | 37.29 |
| Cobalt | 23.81 | 45.76 | 21.24 |
| Manganese | 18.82 | — | 17.11 |
| Aluminum | 0.98 | 1.07 | 3.07 |
| Copper | 1.07 | 0.87 | 2.44 |
| Graphite | 0.84 | 0.75 | 1.27 |
| Iron | 0.21 | 0.18 | 0.87 |

TABLE 3

Statistics of water consumption and cost for sorting to cathode material powder stage

| | Embodiment 1 | Embodiment 2 | Comparative Example 1 |
|---|---|---|---|
| Water consumption | 4.7 tons/ton of materials (including 3.4 tons of circulating water and 1.3 tons of consumed water) | 5.1 tons/ton of materials (including 3.7 tons of circulating water and 1.4 tons of consumed water) | 6.2 tons/ton of materials |
| Cost | 418 RMB/ton of cathode material powder | RMB 535/ton of cathode material powder | RMB 675/ton of cathode material powder |

It can be seen from Tables 1 and 2 that the recycling rates of metals in the waste lithium batteries by the wet sorting process (i.e. Embodiment 1 and Embodiment 2 in Table 1) are higher than these recycling rates by the comparative process (i.e. Comparative Example 1 in Table 1), indicating that the wet process of Embodiments 1 and 2 of the present disclosure is more suitable for recycling related elements of waste lithium batteries in comparison to Comparative Example 1. Meanwhile, in the obtained cathode material powder, under this wet process, the contents of nickel, cobalt and manganese in the cathode materials of Embodiment 1 and Embodiment 2 are higher, and the impurity content is lower, which indicates that the cathode material powder sorted by the process of Embodiment 1 and Embodiment 2 of the present disclosure is purer.

It can be seen from the data in Table 3 that the water consumption and production cost of the wet process of Embodiments 1 and 2 of the present disclosure are smaller than these of Comparative Example 1, and some water may also be reused, which fully embodies the characteristics of low-cost recycling of this process. On the whole, the wet process of Embodiments 1 and 2 of the present disclosure has the characteristics of good recycling effect, low water consumption, low recycling cost, and the like, and has certain advantages and good popularization and application values.

The anaerobic wet sorting process for a waste lithium battery and application thereof provided by the present disclosure have been introduced in detail above, and the principle and implementation of the present disclosure have been illustrated with specific embodiments. The explanation of the above embodiments is only used to help understand the method and the core idea of the present disclosure, including the best mode, and also enables any person skilled in the art to practice the present disclosure, including manufacturing and using any device or system, and implementing any combined method. It should be pointed out that for those of ordinary skills in the art, several improvements and modifications can be made to the present disclosure without departing from the principle of the present disclosure, and these improvements and modifications also fall within the protection scope of the claims of the present disclosure. The protection scope of the present disclosure is defined by the claims, and may include other embodiments that can be thought of by those skilled in the art. If these other embodiments have structural elements that are not different from the literal expression of the claims, or if they include equivalent structural elements that are not materially different from the literal expression of the claims, these other embodiments should also be included in the scope of the claims.

The invention claimed is:

1. A wet sorting process for a waste lithium battery, comprising the following steps of:

(1) carrying out wet ball milling on a sorting material of the waste lithium battery to obtain a ball-milled product;

(2) screening the ball-milled product to obtain a coarse-grained screened material, a medium-grained screened material and a fine-grained screened material; wherein, in step (2), the coarse-grained screened material is returned to step (1) for ball milling;

(3) carrying out wet ball milling, screening, magnetic separation and table concentration on the medium-grained screened material to obtain copper, aluminum and a steel shell; wherein, in step (3), a size of a sieve hole of the screening is 0.15 mm, and a screened product with a size smaller than 0.15 mm is fed into step (4) for flotation; and (4) carrying out flotation, magnetic separation and table concentration on the fine-grained screened material to obtain cathode material powder, graphite, copper and aluminum;

wherein, in step (2), the coarse-grained screened material has a particle size of greater than 2 mm to 4 mm, the medium-grained screened material has a particle size of 0.15 mm to 2 mm, and the fine-grained screened material has a particle size of less than 0.15 mm.

2. The wet sorting process according to claim 1, wherein in step (1), the sorting material of the waste lithium battery is prepared by the following method: soaking the waste lithium battery in saturated brine for electro discharge treatment; washing and drying the discharged waste lithium battery; and calcining and crushing the dried battery to obtain the sorting material of the waste lithium battery.

3. The wet sorting process according to claim 1, wherein in step (1), a mass concentration of the sorting material of the waste battery in the wet ball milling ranges from 50% to 60%, and a filling rate of a steel ball ranges from 35% to 40%.

4. The wet sorting process according to claim 1, wherein in step (3), the specific process of the magnetic separation is: adding the medium-grained screened material to a feeding trough of a magnetic separator, adding water to adjust a concentration of the medium-grained screened material, and feeding the medium-grained screened material into the magnetic separator for magnetic separation to obtain the steel shell, the copper and the aluminum.

5. The wet sorting process according to claim 1, wherein in step (3), a magnetic field intensity of the magnetic separation ranges from 5,000 Gs to 6,000 Gs, and a mass concentration of the fed material of the magnetic separation ranges from 20% to 30%; and in step (4), a magnetic field intensity of the magnetic separation ranges from 3,000 Gs to 4,000 Gs, and a mass concentration of the fed material of the magnetic separation ranges from 30% to 40%.

6. The wet sorting process according to claim 1, wherein in step (4), the specific process of the flotation is: roughing the fine-sized screened material to obtain a roughed concentrate and a roughed tailing, and carrying out primary cleaning and secondary cleaning on the roughed concentrate to obtain a graphite concentrate; and carrying out primary scavenging and secondary scavenging on the roughed tailing to obtain a graphite-removed product.

7. The wet sorting process according to claim 1, wherein in step (4), a preparation used in the flotation comprises a collecting agent, a foaming agent and a dispersing agent; the collecting agent is diesel oil; the foaming agent is No. 2 oil; and the dispersing agent is sodium hexametaphosphate.

8. The wet sorting process according to claim 7, wherein an addition amount of the collecting agent ranges from 200 g/t to 300 g/t; an addition amount of the foaming agent ranges from 150 g/t to 200 g/t; and an addition amount of the dispersing agent ranges from 1,200 g/t to 1,500 g/t.

9. The wet sorting process according to claim 1, wherein in step (3), the specific process of the table concentration is: adding a nonmagnetic material after the magnetic separation to a feeding port of a table concentrator, adding water to adjust a concentration of the nonmagnetic material after the magnetic separation, and vibrating based on a difference in specific gravities between the copper and the aluminum to separate the copper and the aluminum; in step (3), a mass concentration of the fed material of the table concentrator ranges from 15% to 25%; and in step (4), a mass concentration of the fed material of the table concentrator ranges from 25% to 30%.

10. A process for recycling a battery comprising the wet sorting process according to claim 1.

\* \* \* \* \*